United States Patent
Wellner et al.

(10) Patent No.: US 6,831,971 B2
(45) Date of Patent: Dec. 14, 2004

(54) FAULT-TOLERANT LOAD BALANCING OF CONFERENCE CALL BRIDGES

(75) Inventors: Pierre D. Wellner, Middletown, NJ (US); Stephen T. Dacek, Rockville Centre, NY (US); Arthur A. Goikhman, Marlboro, NJ (US); Cary T. Torkelson, Allendale, NJ (US)

(73) Assignee: Spiderphone.com, Inc., Middletown, NJ (US)

( * ) Notice: Subject to any disclaimer, the term of this patent is extended or adjusted under 35 U.S.C. 154(b) by 366 days.

(21) Appl. No.: 10/134,585

(22) Filed: Apr. 29, 2002

(65) Prior Publication Data

US 2002/0172341 A1 Nov. 21, 2002

Related U.S. Application Data

(60) Provisional application No. 60/291,126, filed on May 15, 2001.

(51) Int. Cl.[7] .............................................. H04M 3/56
(52) U.S. Cl. .............. 379/202.01; 370/260; 379/204.01
(58) Field of Search ....................... 379/202.01, 203.01, 379/204.01, 205.01, 206.01; 370/260, 261

(56) References Cited

U.S. PATENT DOCUMENTS

| | | | | | |
|---|---|---|---|---|---|
| 4,796,293 A | * | 1/1989 | Blinken et al. | ........ | 379/202.01 |
| 5,099,510 A | * | 3/1992 | Blinken et al. | ........ | 379/202.01 |
| 5,812,652 A | * | 9/1998 | Jodoin et al. | .......... | 379/205.01 |
| 5,812,653 A | * | 9/1998 | Jodoin et al. | .......... | 379/205.01 |
| 5,978,463 A | * | 11/1999 | Jurkevics et al. | ...... | 379/202.01 |
| 5,995,608 A | * | 11/1999 | Detampel et al. | ...... | 379/205.01 |
| 6,181,786 B1 | * | 1/2001 | Detampel et al. | ...... | 379/205.01 |
| 6,330,321 B2 | * | 12/2001 | Detampel et al. | ...... | 379/205.01 |

* cited by examiner

Primary Examiner—Harry S. Hong
(74) Attorney, Agent, or Firm—Irwin Ostroff; Robert B. Ardis

(57) ABSTRACT

A conference call system receiving calls through a common carrier switch, where the conference call system includes a plurality of multi-port conference bridges, is operated by accepting a bridge having adequate port capacity and for each incoming call for the requested conference: establishing a first incoming connection segment from the carrier switch to the system; prompting the incoming caller for a conference access code; and, if the access code received in response to the prompt matches the conference access code, calling the target bridge through the carrier switch to establish an outgoing connection segment from the system to the carrier switch and a second incoming connection segment from the carrier switch to the target bridge; associating the second incoming connection segment with the incoming call; dropping the first incoming connection segment and the outgoing connection segment; and adding the incoming call to the conference on the target bridge.

12 Claims, 3 Drawing Sheets

FAULT-TOLERANT LOAD BALANCING OF CONFERENCE CALL BRIDGES

CROSS REFERENCE TO RELATED APPLICATION

This application is related to and drawn from Provisional Application Ser. No. 60/291,126, filed May 15, 2001, having the same title as the present application and the same inventors and assignee.

FIELD OF THE INVENTION

This invention relates to telecommunications conference call systems and to methods for operating them in order to balance loads across multiple conference bridges.

BACKGROUND OF THE INVENTION

A conference call service works by connecting multiple telephones through a common carrier switch to ports on a bridge that mixes the audio signals coming from such telephones and sending the result back out through the common carrier switch to those telephones. One common way of operating a conference bridge is to have all participants place outgoing calls from their telephones into the conference call system, and then to have each participant enter a specific access code to signify the conference it is desired to join.

In a large scale system, the conference call service provider typically makes use of a large number of conference bridges. All callers participating in the same conference call, however, need to be placed on the same bridge. This means that the common technique of having incoming calls hunt across all bridges for an available port does not work for conference call systems. Because each conference call is not independent of the others, it must be placed on the same bridge with all other calls in the same conference.

In a conference call system with multiple bridges, what is required is selection of a particular bridge to be used for a particular conference call and connection of each incoming caller to the designated conference on the designated bridge so that:

1) Each customer can maintain a fixed telephone number to call and an access code to use that remains the same for all of his conference calls over time.

2) The system and conference call service provider can change the specific bridge that any customer uses for conference calls from time to time. This may be done, for example, when the conference call service provider adds more bridge capacity to its system, or when capacity is reduced when bridges go out of service because of hardware or software problems or because of maintenance.

3) The system can balance conference call loads across multiple conference bridges. If conference A is unexpectedly large, or continues for an unexpectedly long time, then a bridge which had been anticipated to become available for conference B may be busy at the time conference B is scheduled to begin. If another bridge has capacity available at this time, then the conference call service provider should be able to dynamically place conference B on a bridge that has sufficient available resources.

One common approach to schedule conference calls is to give each customer who makes a conference call reservation or request a telephone number and an access code at the time the reservation or request is made. The telephone number provides access to a specific bridge and, if that bridge is out of service at the time of the call, then the customer must use a different phone number to access a different bridge.

In order to give customers the same phone number for every reservation or request they make, each customer can be assigned to a specific bridge. Bridge hardware must be very fault tolerant, which adds to its expense, and load balancing must be done, e.g., by assigning each new customer to the most lightly loaded bridge. Such a method of load balancing is very crude, however, and there is no easy way to deal with an unexpected situation when all the customers assigned to the same bridge decide to request a conference call scheduled to begin at the same time. In this instance, the bridge in question may run out of port capacity, even if other bridges in the system happen to be free.

Another known approach to solving the problem is to implement an inter-bridge connection so that all the bridges in a conference call system are connected together. This allows incoming calls to terminate on any of the bridges in the system and to be routed over the inter-bridge connection to the appropriate bridge. Any bridge can terminate the call and prompt for the participant access code. Once the access code has been received and verified, the system can determine which of the bridges the conference is being held on and route the call to that bridge using the inter-bridge connection. A disadvantage of this approach is that it requires additional hardware to connect the bridges. This hardware adds to the expense and provides additional ways in which the system can fail.

A third approach to solving the problem is to connect all the bridges in the conference call system to the public switched telephone (PSTN) network through a large, special-purpose switch such as a private branch exchange (PBX) instead of connecting directly to the carrier's equipment in such a way that all calls come in through this switch, and this switch can be controlled by the system to route calls to the appropriate bridge. The disadvantage of this approach is that for each bridge port of capacity, the conference call service provider must also purchase and install two additional ports on this switch: one to connect to the bridge, and another to connect to the carrier. Adding this switch is expensive and may introduce another point of potential failure.

SUMMARY OF THE INVENTION

In accordance with the invention, a conference call system receiving calls through a common carrier switch, where the conference call system comprises at least two multi-port conference bridges is operated by: accepting a conference call request for n participants, where n is an integer greater than unity, and assigning a conference access code for the request; selecting one of the conference bridges having port capacity for at least n participants as a target bridge for the request; and for each incoming call for the requested conference through the carrier switch: (1) establishing a first incoming connection segment from the carrier switch to the system; (2) prompting the incoming caller for a conference access code; and (3), if the access code received in response to the prompt matches the conference access code, calling the target bridge through the carrier switch to establish an outgoing connection segment from the system to the carrier switch and a second incoming connection segment from the carrier switch to the target bridge; (4) associating the second incoming connection segment with the incoming call; (5) dropping the first incoming connection segment and the outgoing connection segment; and (6) adding the incoming call to the conference on the target bridge. In this manner, each conference call is reliably established on a bridge having sufficient available port capacity without having to designate that bridge in advance of the conference. Customers may still be assigned the same phone number for making reservations or initiating conference calls and load balancing among conference bridges does not have to be performed in advance. The conference access code may, if desired, be assigned in advance.

From a further aspect of the invention, the conference call system includes an interactive voice response (IVR) transfer unit connected to receive incoming calls to the system from the carrier switch. Such an IVR transfer unit is capable of initiating calls through the carrier switch to any of the conference bridges. The system is operated by prompting callers through the carrier switch for the access code and receiving access codes through the carrier switch from callers. From this aspect of the invention, the first incoming connection segment is established from the carrier switch to the IVR transfer unit and the outgoing connection segment is established from the IVR transfer unit to the carrier switch.

From another aspect of the invention, at least one of the conference bridges is interactive voice response (IVR) capable and is connected to receive incoming calls to the system from the carrier switch. Such an IVR capable bridge is also capable of initiating calls through the carrier switch to any of the remaining conference bridges. From this aspect of the invention, callers are prompted through the carrier switch for the access code, and access codes are received through the carrier switch from callers, the first incoming connection segment is established from the carrier switch to the IVR capable conference bridge, and the outgoing connection segment is established from the IVR capable conference bridge to the carrier switch.

From yet another aspect of the invention, if the access code received in response to the prompt does not match the access code, the incoming call is excluded from the conference on the target bridge.

The invention may be more fully understood from the following detailed description, taken in the light of the accompanying drawings and the appended claims.

DETAILED DESCRIPTION

Figure 1:
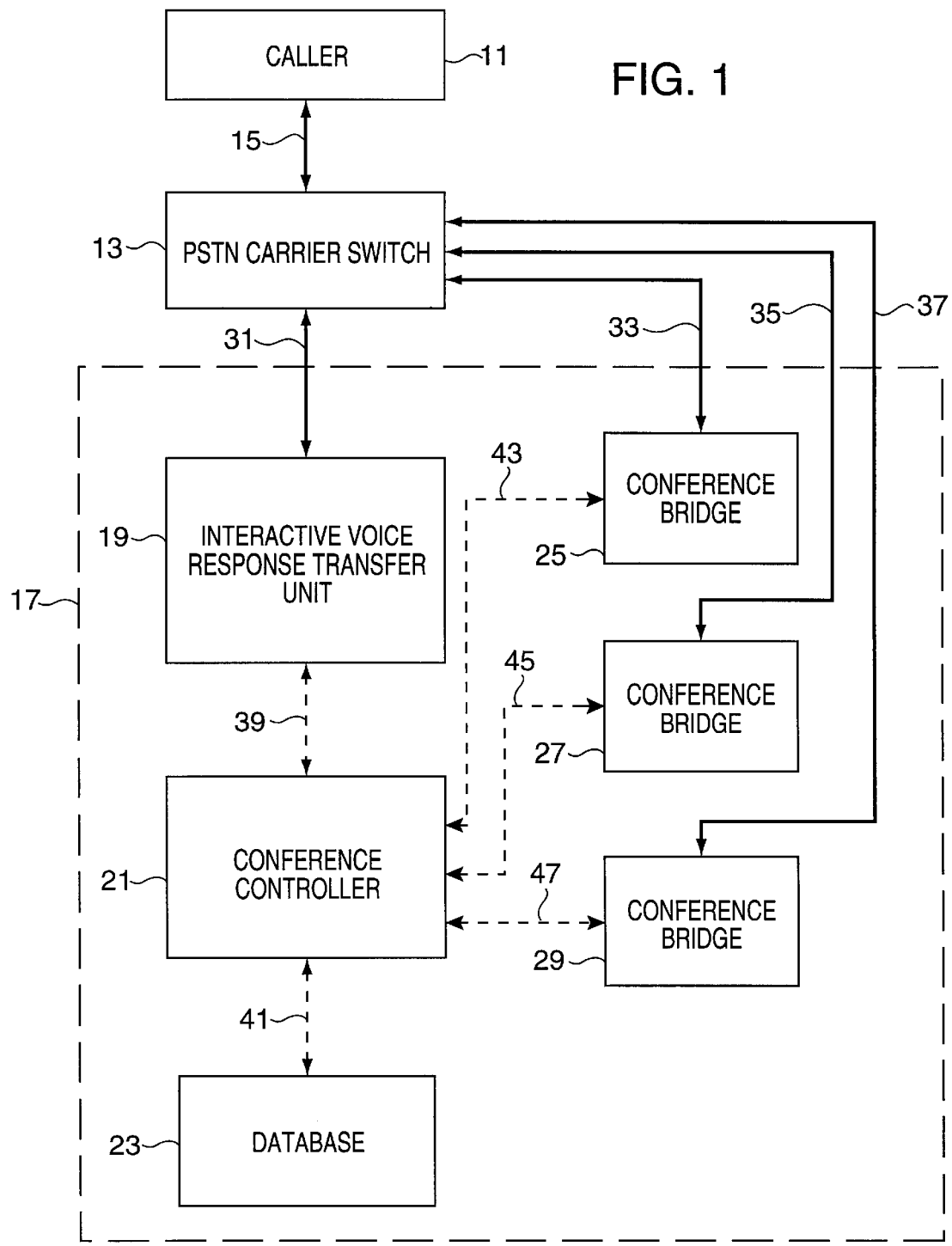
FIG. 1 is a block diagram of equipment used to provide conference call service in accordance with the invention.

In FIG. 1, telecommunication signal carrying paths are represented by solid lines and control paths are represented by dashed lines. A caller 11 is connected to a PSTN (Public Switched Telephone Network) switch 13 by way of a bilateral signal transmission path 15. Switch 13 may, by way of example, take the form of a 5ESS or a DMS 500 switch. The remainder of the equipment shown in FIG. 1 is a conference call system 17 (shown within a dashed line rectangle), typically provided on the conference call service provider's premises, and bilateral telecommunication signal carrying paths connecting that system to PSTN carrier switch 13.

Conference call system 17 comprises an interactive voice response transfer unit 19, a conference controller 21, a database 23 accessible by conference controller 21, and a plurality of conference bridges 25, 27, and 29. Three conference bridges are shown by way of example, but there may be any number as needed to meet anticipated service requirements. A bilateral switched telecommunication signal carrying path 31 connects PSTN carrier switch 13 to interactive voice response transfer unit 19. Respective bilateral switched telecommunication signal carrying paths 33, 35, and 37 connect PSTN carrier switch 13 to conference bridges 25, 27, and 29, respectively.

Bilateral control paths in conference call system 17 include a control path 39 connecting interactive voice response transfer unit 19 with conference controller 21, a control path 41 connecting conference controller 21 with database 23, a control path 43 connecting conference controller 21 with conference bridge 25, a control path 45 connecting conference controller 21 with conference bridge 27, and a control path 47 connecting conference controller 21 with conference bridge 29. Additional control paths may be provided between conference controller 21 and additional conference bridges, as needed. Interactive voice response transfer unit 19 may be replicated as needed, connected through switched connections in the manner illustrated to PSTN carrier switch 13 and to conference controller 21 and database 23. Alternatively, interactive voice response transfer unit 19 may be part of one of conference bridges 25, 27, or 29.

One way of implementing the transfer of calls from interactive voice response transfer unit 19 to one of conference bridges 25, 27, or 29 is through standard ISDN (Interactive Services Digital Network) TBCT (Two B-Channel Transfer), according to Bellcore Generic Requirements GR-2865-CORE, ISSUE 2, May 1997—Generic Requirements for ISDN PRI Two B-Channel Transfer. Other known methods may be used as well.

Figure 2:
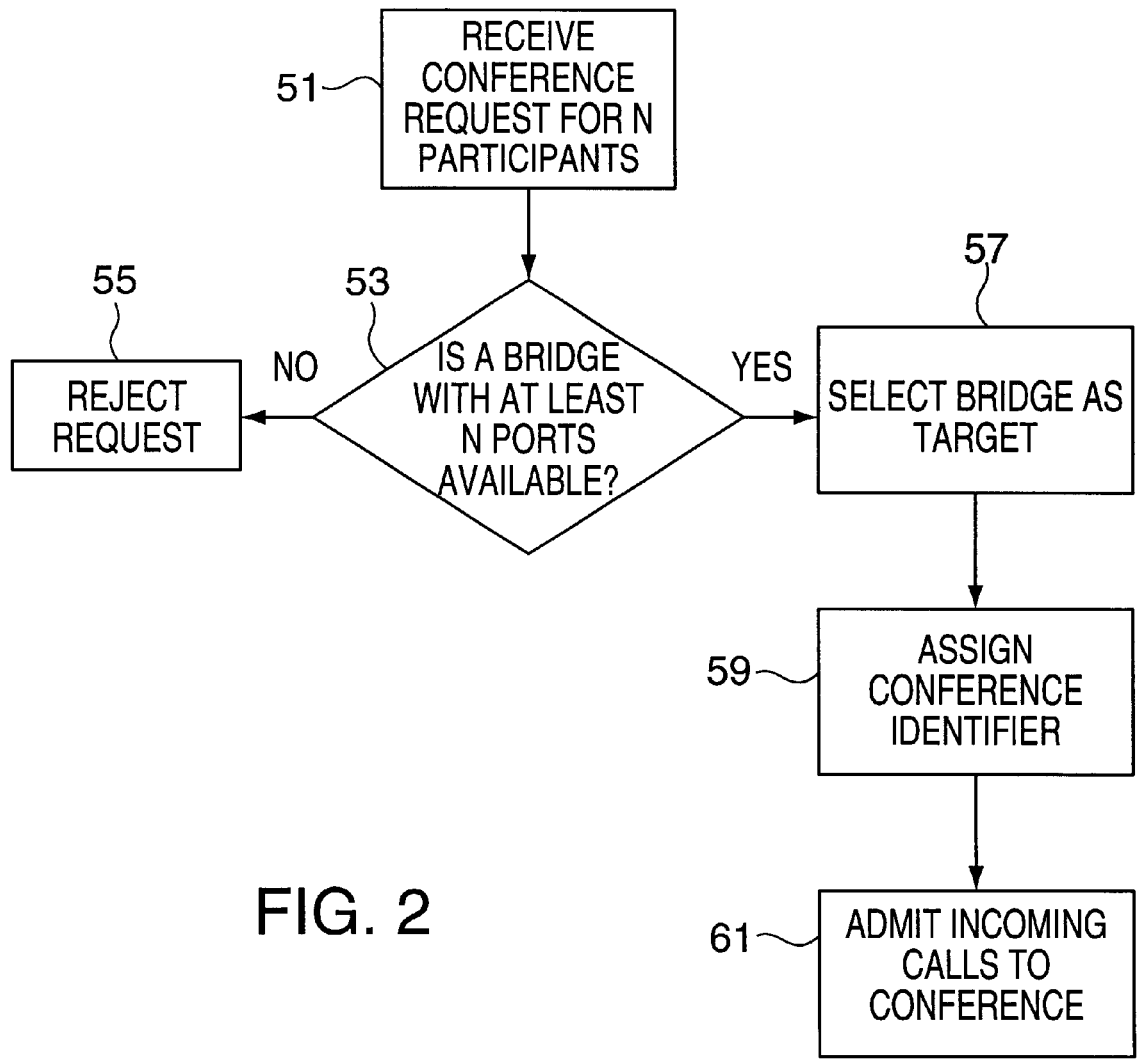
FIG. 2 is a flow chart showing a sequence of steps taken, in accordance with the invention, when a user requests that a conference be set up by a service provider.
Figure 3:
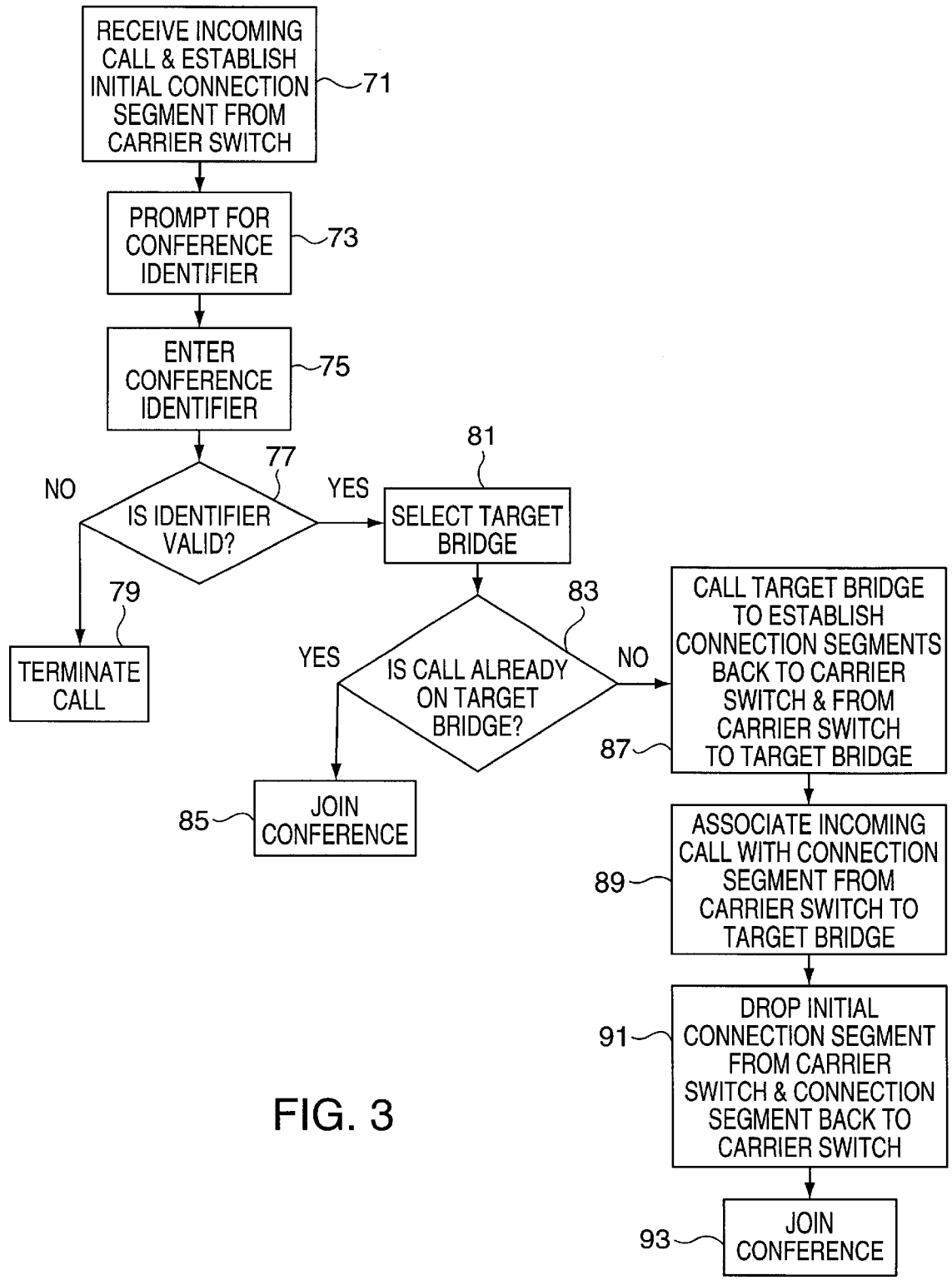
FIG. 3 is a flow chart showing a sequence of steps taken, in accordance with the invention, when an incoming caller asks to be added to a conference that has already been set up by a service provider.

Operation of the equipment illustrated in FIG. 1 is best described in conjuction with the flow charts illustrated in FIGS. 2 and 3. As has already been stated, FIG. 2 is a flow chart showing a sequence of steps taken, in accordance with the invention, when a user requests that a conference be set up by a service provider and FIG. 3 is a flow chart showing a sequence of steps taken, in accordance with the invention, when an incoming caller asks to join a conference that has already been set up by the service provider.

The flow chart FIG. 2 comprises steps 51, 53, 55, 57, 59, and 61. The sequence begins with step 51, in which a conference request for n participants is received. The next step, step 53, determines whether or not a conference bridge having at least n ports is available. If the answer is NO, the sequence proceeds to step 55, rejection of the request, and exits. If the answer is YES, the sequence proceeds to step 57, which selects an available bridge as a target bridge, to step 59, which assigns a numeric code as a conference identifier, storing it in database 23, and to step 61, which admits the incoming call to the conference. The numeric code assigned by step 59 may have been pre-assigned for a particular customer of the conference call service provider or it may be generated and assigned at the time a conference call is established. Also, the target bridge selected by step 57 may have been pre-assigned or it may, alternatively, be selected as the conference call is being established.

Once a conference has been established in the manner shown in FIG. 2, incoming calls are admitted to that conference in the manner shown in FIG. 3. The flow chart in FIG. 3 comprises steps 71, 73, 75, 77, 79, 81, 83, 85, 87, 89, 91, and 93. Equipment references herein and within the flow chart in FIG. 3 all relate to that illustrated in FIG. 1. In FIG. 3, the sequence begins with step 71, which receives an incoming call and establishes an initial switched connection segment 31 (which may be described, for convenience, as in-leg 1) from PSTN carrier switch 13 to interactive voice response transfer unit 19. Step 73 follows and prompts for the conference identifier established by step 59 in FIG. 2. In step 75, the caller enters a numeric code as conference identifier and the sequence proceeds to step 77 and there determines whether or not there is a match with the code previously stored in database 23. If the identifier entered by the caller is invalid (a NO decision, meaning that there is no match), the process exits at step 79 and the incoming call is terminated.

If the identifier entered by the caller is valid (a YES decision, meaning that there is a match), the process proceeds to step 81, in which conference controller 21 selects a conference bridge (conference bridge 25, by way of example) as the target bridge. If the incoming call is already connected via switched connection 31 to the target bridge, as it would be if the functions of interactive voice response transfer unit 19 were included within conference bridge 25, the process exits at step 85 and the caller joins the conference.

If the call is not already connected to the target bridge, the process moves to step 87, which calls the target bridge from PSTN carrier switch 13 over switched connection segment 31 (which may be described, for convenience, as out-leg 1) and instructs it to establish connection segment 33 from PSTN carrier switch 13 to the target bridge (which may be described, for convenience, as in-leg 2). Next, step 89 associates the incoming call with connection segment 33 from carrier switch 13 to the target bridge. In this step, transfer unit 19 and the target bridge (e.g., bridge 25) handshake to associate the incoming connection on the target bridge (in-leg 2) with the correct incoming and outgoing connections on the transfer unit (in-leg 1 and out-leg 1). One way this can be done is to have transfer unit 19 play tones that are detected by the target bridge. Another is to send data over an ISDN connection, for example, as a unique caller id string. Then the target bridge can play a DTMF ton back to transfer unit 19 to acknowledge that it hs identified what to do with this incoming call.

In step 91, transfer unit 19 initiates a transfer command, identifying the incoming connection and its associated outgoing connection. When the transfer is completed by carrier switch 13, both incoming in-leg 1 and outgoing out-leg 1 connections on transfer unit 19 are dropped, and their ports become available for use in another call. Finally, step 93 permits the incoming call to join the conference.

For fault-tolerance, more than one transfer unit can be connected to carrier switch 13, so that if one of the transfer units is down or if its line is disconnected, then incoming calls will hunt to the next transfer unit. The hunting mechanism used to find an available channel across multiple lines on multiple lines on muliitple transfer units is a standard feature of any carrier PSTN switch.

A key requirement of the transfer unit is that it must be able to make outgoing calls to the target bridge as well as accept incoming calls. This means that, even under maximum load, the transfer unit must reserve a few of its ports for dialing out, and must never fill all its available ports with incoming calls. If the transfer unit has no lines available for dialing out to a target bridge, then it will not be able to accomplish the transfer function. A number of techniques may be used to reserve pors for dialing out only. One possibility is to connect the transfer unit to a circuit that is dedicated to dialing out only, and for the PSTN switch not to include channels on this circuit as part of the same inbound hunt group as the circuits used for incoming calls.

When sharing a circuit for both inbound and outbound calls (as is often done with ISDN PRI circuits), the transfer unit can explicitly disable specific B-channels from accepting incoming calls in order to reserve them for use in making the outgoing calls.

The optimal numbe of ports to reserve for outgoing calls relative to the total number of ports available on the transfer unit depends on traffic statistics and the relative durations for in-leg 1 and out-leg 1. The optimal total number of ports to be made available on the transfer box relative to the total number of ports available on all the bridges that the transfer unit serves also depends on traffic statistics—including the typical durations of in-leg 1 and out-leg 2 as well as what proportion of callers that join conference calls dial in at the same time.

It is also useful to configure the transfer circuits on the PSTN switch so that it distributes incoming calls equally across all the transfer circuits. Standard methods can be used for doing this, for example round-robin.

It is to be understood that the embodiment of the invention which has been described is illustrative. Numerous other arrangements and modifications may be readily devised by those skilled in the art without departing from the spirit and scope of the invention.

What is claimed is:

1. A method of operating a conference call system receiving calls through a carrier switch, said conference call system comprising at least two multi-port conference bridges and said method comprising the steps of:

accepting a conference call request for n participants, where n is an integer greater than unity, and assigning an access code for said request;

selecting one of said conference bridges having port capacity for at least n participants as a target bridge for said request; and for each incoming call for the requested conference through said carrier switch:

(1) establishing a first incoming connection segment from said carrier switch to said system;

(2) prompting the incoming caller for an access code; and (3) if the access code received in response to said prompt matches said access code, calling said target bridge through said carrier switch to establish an outgoing connection segment from said system to said carrier switch and a second incoming connection segment from said carrier switch to said target bridge;

(4) associating said second incoming connection segment with the incoming call;

(5) dropping said first incoming connection segment and said outgoing connection segment; and (6) adding the incoming call to the conference on said target bridge.

2. The method of claim 1 in which:

said system includes an interactive voice response (IVR) transfer unit connected to receive incoming calls to said system from said carrier switch;

said IRV transfer unit is capable of initiating calls through said carrier switch to any of said conference bridges, prompting callers through said carrier switch for said access code, and receiving access codes through said carrier switch from callers;

in which said first incoming connection segment is established from said carrier switch to said IVR transfer unit; and in which said outgoing connection segment is established from said IVR transfer unit to said carrier switch.

3. The method of claim 2 in which said IVR transfer unit is one of said conference bridges.

4. The method of claim 1 in which:

at least one of said conference bridges is interactive voice response (IVR) capable and is connected to receive incoming calls to said system from said carrier switch;

said IRV capable bridge is also capable of initiating calls through said carrier switch to any of the remaining conference bridges, prompting callers through said carrier switch for said access code, and receiving access codes through said carrier switch from callers;

in which said first incoming connection segment is established from said carrier switch to said IVR capable conference bridge; and in which said outgoing connection segment is established from said IVR capable conference bridge to said carrier switch.

5. The method of claim 1 in which, if the access code received in response to said prompt does not match said access code, the incoming call is excluded from the conference on said target bridge.

6. The method of claim 1 in which said incoming and outgoing connections are established or dropped through an Integrated Services Digital Network Two B-Channel Transfer process.

7. A conference call system for receiving calls through a carrier switch, said conference call system comprising:

at least two multi-port conference bridges;

means for accepting a conference call request for n participants, where n is an integer greater than unity, and assigning a access code for said request;

means for selecting one of said conference bridges having port capacity for at least n participants as a target bridge for said request; and means for, for each incoming call for the requested conference through said carrier switch:

(1) establishing a first incoming connection segment from said carrier switch to said system;

(2) prompting the incoming caller for a access code; and (3) if the access code received in response to said prompt matches said access code, calling said target bridge through said carrier switch to establish an outgoing connection segment from said system to said carrier switch and a second incoming connection segment from said carrier switch to said target bridge;

(4) associating said second incoming connection segment with the incoming call;

(5) dropping said first incoming connection segment and said outgoing connection segment; and (6) adding the incoming call to the conference on said target bridge.

8. The conference call system of claim 7 in which:

said system includes an interactive voice response (IVR) transfer unit connected to receive incoming calls to said system from said carrier switch;

said IRV transfer unit is capable of initiating calls through said carrier switch to any of said conference bridges, prompting callers through said carrier switch for said access code, and receiving access codes through said carrier switch from callers;

in which said first incoming connection segment is established from said carrier switch to said IVR transfer unit; and in which said outgoing connection segment is established from said IVR transfer unit to said carrier switch.

9. The conference call system of claim 8 in which said IVR transfer unit is one of said conference bridges.

10. The conference call system of claim 7 in which:

at least one of said conference bridges is interactive voice response (IVR) capable and is connected to receive incoming calls to said system from said carrier switch;

said IVR capable bridge is also capable of initiating calls through said carrier switch to any of the remaining conference bridges, prompting callers through said carrier switch for said access code, and receiving access codes through said carrier switch from callers;

in which said first incoming connection segment is established from said carrier switch to said IVR capable conference bridge; and in which said outgoing connection segment is established from said IVR capable conference bridge to said carrier switch.

11. The conference call system of claim 7 in which, if the access code received in response to said prompt does not match said access code, the incoming call is excluded from the conference on said target bridge.

12. The method of claim 7 in which said incoming and outgoing connections are established or dropped through an Integrated Services Digital Network Two B-Channel Transfer process.

* * * * *